US012578544B2

(12) United States Patent
Zhuang et al.

(10) Patent No.: US 12,578,544 B2
(45) Date of Patent: Mar. 17, 2026

(54) OPTICAL ELEMENT DRIVING MECHANISM

(71) Applicant: TDK TAIWAN CORP., Taoyuan City (TW)

(72) Inventors: Po-Xiang Zhuang, Taoyuan City (TW);
Chen-Hung Chao, Taoyuan City (TW);
Yen-Sheng Liu, Taoyuan City (TW);
Shou-Jen Liu, Taoyuan City (TW);
Yi-Ho Chen, Taoyuan City (TW);
Yung-Hsien Yeh, Taoyuan City (TW)

(73) Assignee: TDK TAIWAN CORP., Taoyuan City (TW)

( * ) Notice: Subject to any disclaimer, the term of this patent is extended or adjusted under 35 U.S.C. 154(b) by 294 days.

(21) Appl. No.: 18/462,696

(22) Filed: Sep. 7, 2023

(65) Prior Publication Data

US 2024/0077745 A1 Mar. 7, 2024

Related U.S. Application Data

(60) Provisional application No. 63/404,398, filed on Sep. 7, 2022.

(51) Int. Cl.
| | |
|---|---|
| *G02B 7/08* | (2021.01) |
| *G02B 5/00* | (2006.01) |
| *G02B 7/09* | (2021.01) |
| *G02B 13/00* | (2006.01) |
| *G02B 27/64* | (2006.01) |

(52) U.S. Cl.
CPC ............... *G02B 7/08* (2013.01); *G02B 5/005* (2013.01); *G02B 7/09* (2013.01); *G02B 13/001* (2013.01); *G02B 27/646* (2013.01)

(58) Field of Classification Search
CPC . G02B 7/021; G02B 7/08; G02B 7/09; G02B 7/10; G02B 9/62; G02B 13/001; G02B 13/0065; G02B 27/646; G02B 5/005; H04N 5/2253; H04N 5/2254; H04N 5/2257; H04N 5/23287; G03B 2205/00; G03B 2205/0007; G03B 2205/0053; G03B 2205/0069; G03B 3/02; G03B 3/10; G03B 5/00; G03B 5/04; G03B 13/36; G03B 30/00; G03B 9/02; G03B 9/06; G03B 9/08; G03B 9/26; H02K 11/21; H02K 11/33; H02K 41/0354; H02K 41/0356
USPC ....... 359/359, 911, 554, 555, 557, 811, 813, 359/814, 824, 872, 877, 396, 52, 55, 739, 359/505–510; 396/359, 911, 554, 555, 396/557, 811, 813, 814, 824, 872, 877, 396/396, 52, 55, 739, 505–510
See application file for complete search history.

(56) References Cited

U.S. PATENT DOCUMENTS

| | | | |
|---|---|---|---|
| 2020/0012170 A1* | 1/2020 | Hong | G02B 26/02 |
| 2024/0377706 A1* | 11/2024 | Gong | H02K 41/0354 |

FOREIGN PATENT DOCUMENTS

| | | | | |
|---|---|---|---|---|
| CN | 211698367 U | 10/2020 | | |
| CN | 114285242 A | * | 4/2022 | ......... H02K 41/0354 |

* cited by examiner

*Primary Examiner* — Marin Pichler
(74) *Attorney, Agent, or Firm* — Muncy, Geissler, Olds & Lowe, P.C.

(57) ABSTRACT

An optical element driving mechanism is provided. The optical element driving mechanism includes a movable portion used for connecting an optical element, a fixed portion, and a driving assembly used for driving the movable portion to move relative to the fixed portion. The movable portion is movable relative to the fixed portion.

19 Claims, 14 Drawing Sheets

1000

1121

1110

1142

1120

1121

1410

1141

1510

1530

Z(1971)
Y(1972)
X(1973)

OPTICAL ELEMENT DRIVING MECHANISM

CROSS REFERENCE TO RELATED APPLICATIONS

This application claims priority of U.S. Provisional Application No. 63/404,398, filed on Sep. 7, 2022, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical element driving mechanism is provided. The optical element driving mechanism includes a movable portion used for connecting an optical element, a fixed portion, and a driving assembly used for driving the movable portion to move relative to the fixed portion. The movable portion is movable relative to the fixed portion.

In some embodiments, the fixed portion includes a strengthen element and a bottom. The strengthen element is disposed in the bottom. The strengthen element includes metal. The driving assembly includes a first magnetic element and a second magnetic element. The first magnetic element and the second magnetic element are disposed on opposite sides of a virtual plane. The movable portion and the fixed portion are arranged along a main axis. The main axis extends in a first axis. The virtual plane overlaps the main axis.

In some embodiments, the strengthen element includes a first strengthen element bending portion, a second strengthen element bending portion, a third strengthen element bending portion, and a strengthen element extending portion. The strengthen element extends in an axis perpendicular to the first axis. The first strengthen element bending portion connects to the strengthen element extending portion and bends from the strengthen element extending portion. The second strengthen element bending portion connects to the strengthen element extending portion and bends from the strengthen element extending portion. The third strengthen element bending portion connects to the strengthen element extending portion and bends from the strengthen element extending portion.

In some embodiments, the strengthen element includes magnetic permeable material. The strengthen element extending portion is not exposed from the bottom when viewed along the first axis. At least a portion of the first strengthen element bending portion is exposed from the bottom when viewed along the first axis. At least a portion of the second strengthen element bending portion is exposed from the bottom when viewed along the first axis. At least a portion of the third strengthen element bending portion is exposed from the bottom when viewed along the first axis.

In some embodiments, the first strengthen element bending portion, the second strengthen element bending portion, and the third strengthen element bending portion are separated from each other. The first strengthen element bending portion and the first magnetic element at least partially overlap each other when viewed along the main axis. The second strengthen element bending portion and the second magnetic element at least partially overlap each other when viewed along the main axis.

In some embodiments, the optical element driving mechanism further includes a circuit assembly and a magnetic permeable element. The circuit assembly includes a first circuit element and a second circuit element. The driving assembly further includes a first driving coil and a second driving coil. The first driving coil corresponds to the first magnetic element and the first circuit element. The second driving coil corresponds to the first magnetic element and the second circuit element. The magnetic permeable element is disposed on the first circuit element.

In some embodiments, the first magnetic element and the magnetic permeable element are disposed on opposite sides of the first circuit element. The first circuit element and the second circuit element are disposed on opposite sides of the virtual plane.

In some embodiments, the optical element driving mechanism further includes a conductive element disposed on the bottom. The fixed portion further includes a case. The case is in direct contact with the conductive element and electrically connected to the conductive element for grounding through the conductive element. The conductive element includes a first conductive portion, a second conductive portion, a third conductive portion, a fourth conductive portion, and a conductive connection portion disposed in the bottom.

In some embodiments, the optical element driving mechanism further includes a conductive element disposed on the bottom. The first conductive portion and the second conductive portion extends along the first axis. The third conductive portion and the fourth conductive portion extends in a third axis. The first axis and the third axis are different.

In some embodiments, the first conductive portion and the second conductive portion are in direct contact with the case. The first conductive portion, the second conductive portion, the third conductive portion, and the fourth conductive portion at least partially exposed from the bottom. The conductive connection portion is not exposed from the bottom. The conductive connection portion connects to the first conductive portion, the second conductive portion, the third conductive portion, and the fourth conductive portion.

In some embodiments, the first conductive portion and the second conductive portion are disposed on opposite sides of the virtual plane when viewed along the main axis. The third conductive portion and the fourth conductive portion are disposed on opposite sides of the virtual plane when viewed along the main axis.

In some embodiments, the first conductive portion and the third conductive portion are disposed on an identical side of the virtual plane when viewed along the main axis. The second conductive portion and the second conductive portion are disposed on an identical side of the virtual plane when viewed along the main axis. The first conductive portion and the third conductive portion extend in different axes. The second conductive portion and the fourth conductive portion extend in different axes.

In some embodiments, the bottom includes a first recess. The case includes a second recess. The first conductive portion is disposed in the first recess when viewed along the first axis. A portion of the first conductive portion overlaps the second recess when viewed along the first axis. Another portion of the first conductive portion do not overlap the second recess when viewed along the first axis. The first recess and the second recess partially overlap with each other.

In some embodiments, the first conductive portion is exposed form the first recess. The third axis and the first axis are perpendicular. The first recess has a first width in the third axis. The second recess has a second width in the third axis. The first width is greater than the second width.

In some embodiments, a second axis is perpendicular to the first axis and the third axis. The first recess has a first length in the second axis. The second recess has a second length in the second axis. The first length is less than the second length.

In some embodiments, the movable portion includes a holder, a stopping portion, and a blade assembly. The stopping portion extends from the holder to the case. The blade assembly includes a first blade and a second blade arranged in the first axis. The blade assembly and the case are arranged along the first axis.

In some embodiments, a distance between the stopping portion and the case is less than a distance between the first blade and the case in the first axis. A distance between the stopping portion and the case is less than a distance between the second blade and the case in the first axis.

In some embodiments, a distance between the stopping portion and the case is greater than 0.3 mm in the first axis. The movable portion further includes a first movable portion column and a second movable portion column extending to the case. The first movable portion column and the second movable portion column do not penetrate the case. The first movable portion column penetrates the first blade. The second movable portion column penetrates the second blade.

In some embodiments, the optical element driving mechanism further includes a first low-reflection element disposed on the fixed portion. The bottom includes a first bottom column extending in the first axis. The first bottom column penetrates the case. The first bottom column penetrates the first low-reflection element.

In some embodiments, the bottom includes further a second bottom column, and a third bottom column extending in the first axis. The second bottom column does not penetrate the case. The second bottom column does not penetrate the first low-reflection element. The second bottom column penetrates the first blade. The third bottom column does not penetrate the case. The third bottom column does not penetrate the first low-reflection element. The third bottom column penetrates the second blade.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
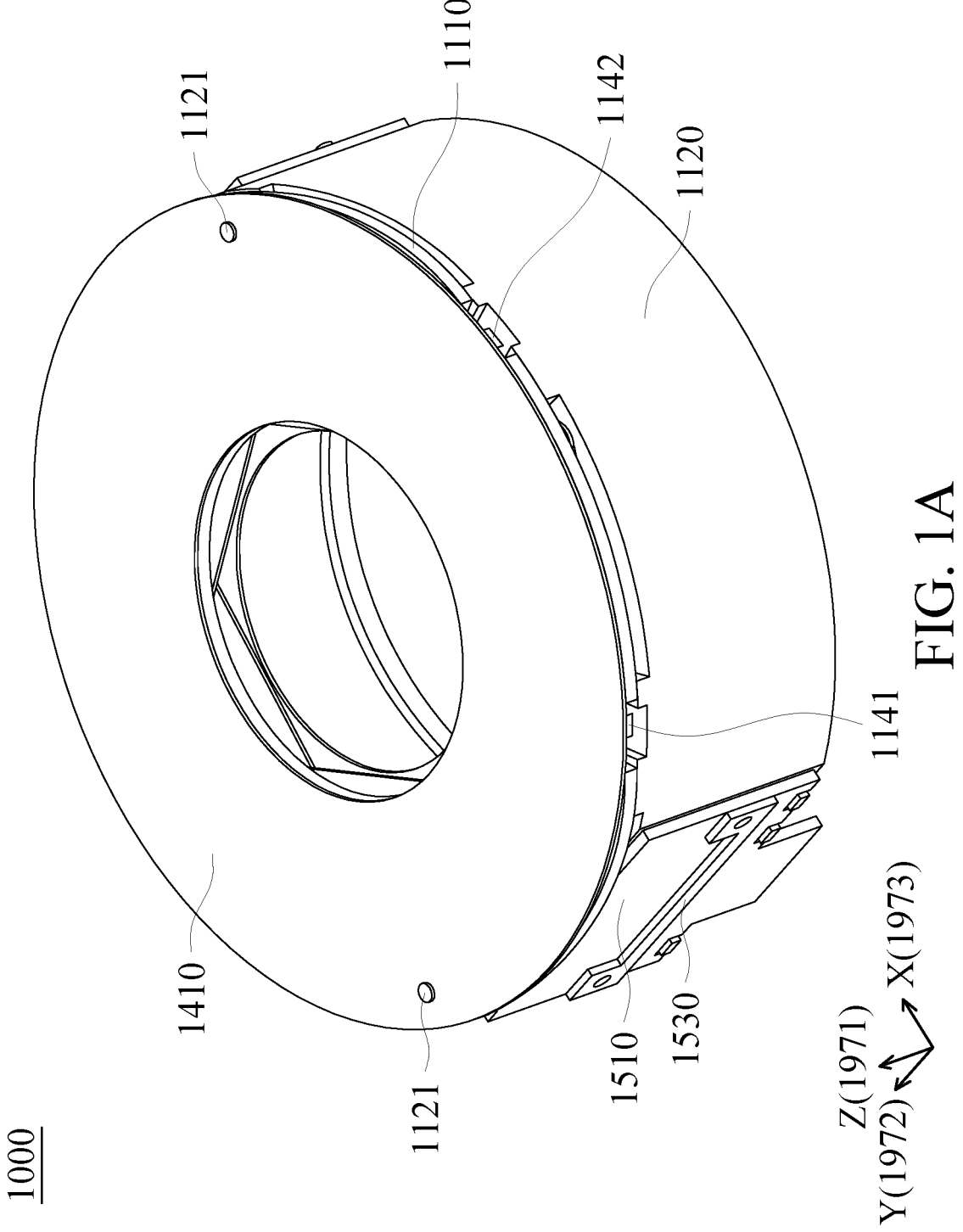
FIG. 1A and FIG. 1B are schematic view of an optical element driving mechanism.

The following disclosure provides many different embodiments, or examples, for implementing different features of the provided subject matter. Specific examples of elements and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
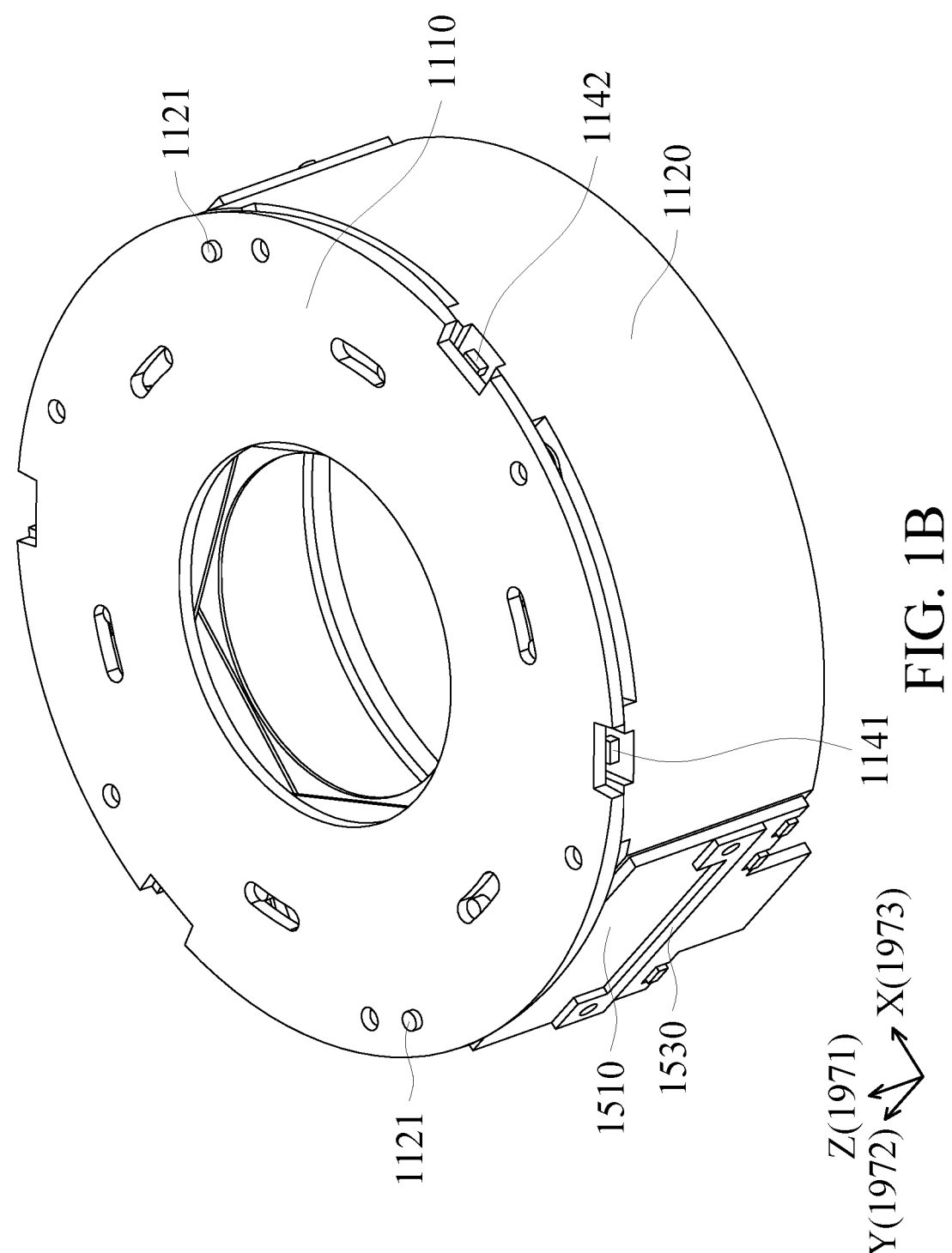
Figure 1C:
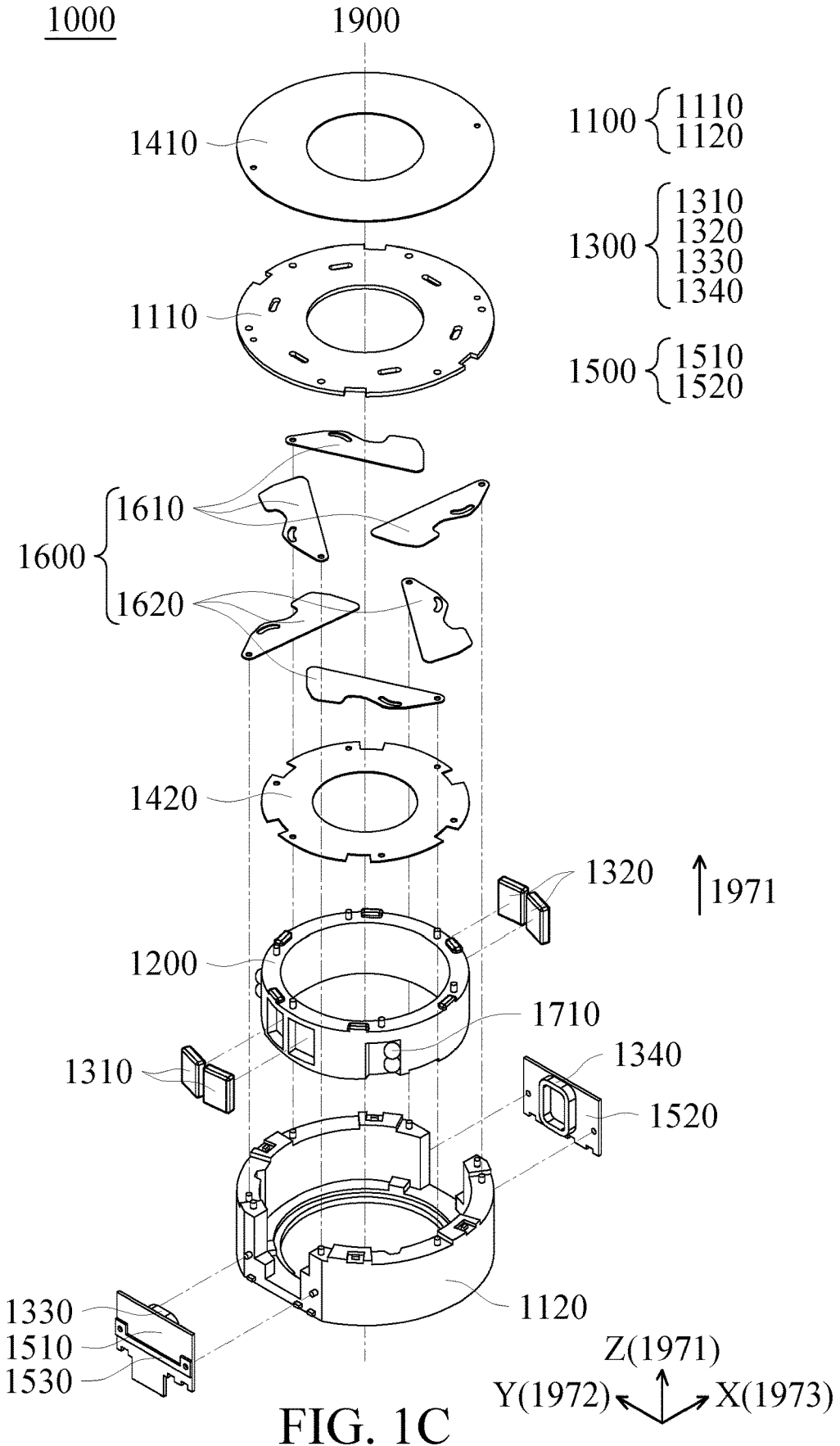
FIG. 1C is an exploded view of the optical element driving mechanism.
Figure 1D:
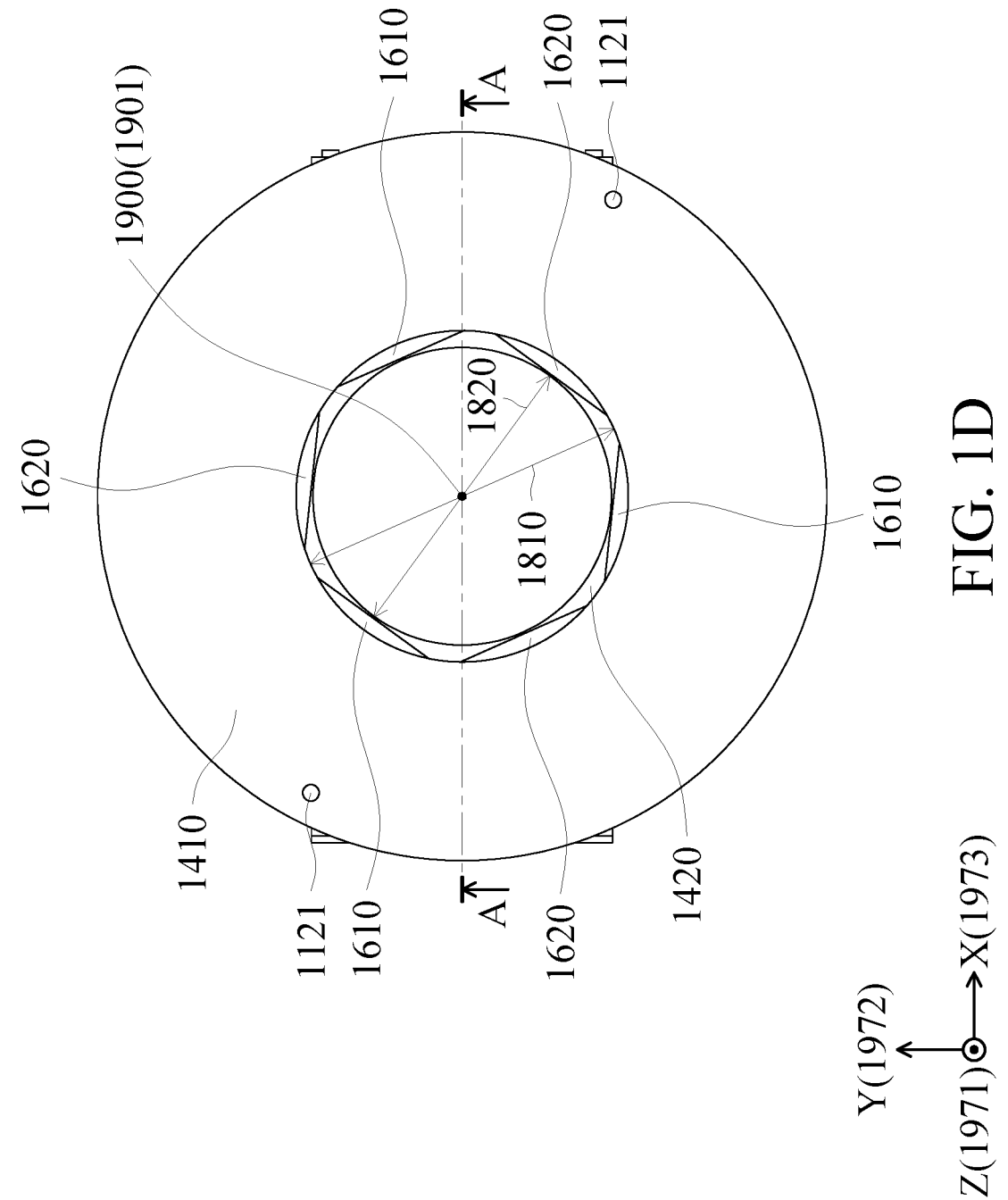
FIG. 1D is a top view of the optical element driving mechanism.
Figure 1E:
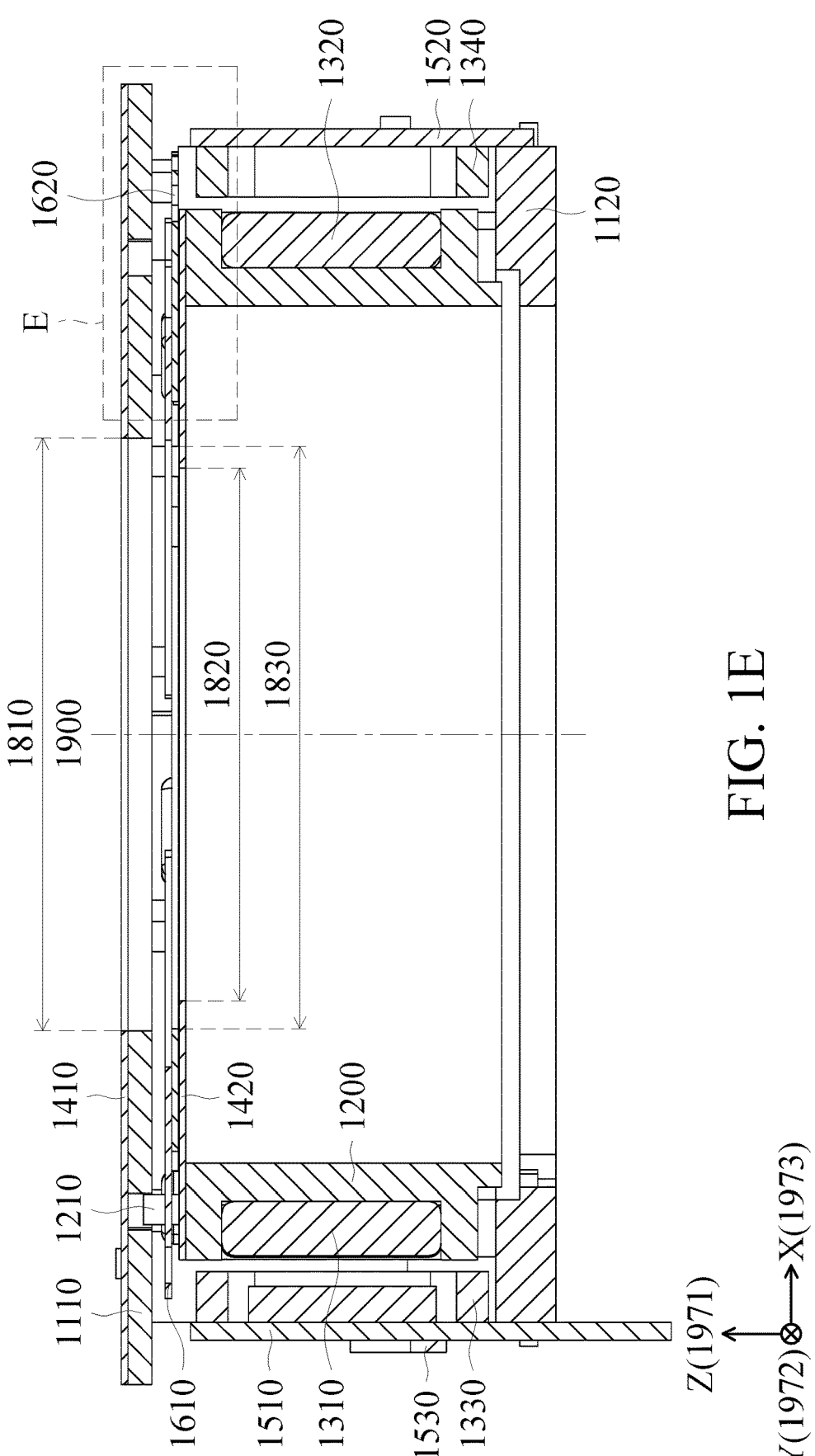
FIG. 1E is a cross-sectional view illustrated along line A-A in FIG. 1D.
Figure 1F:
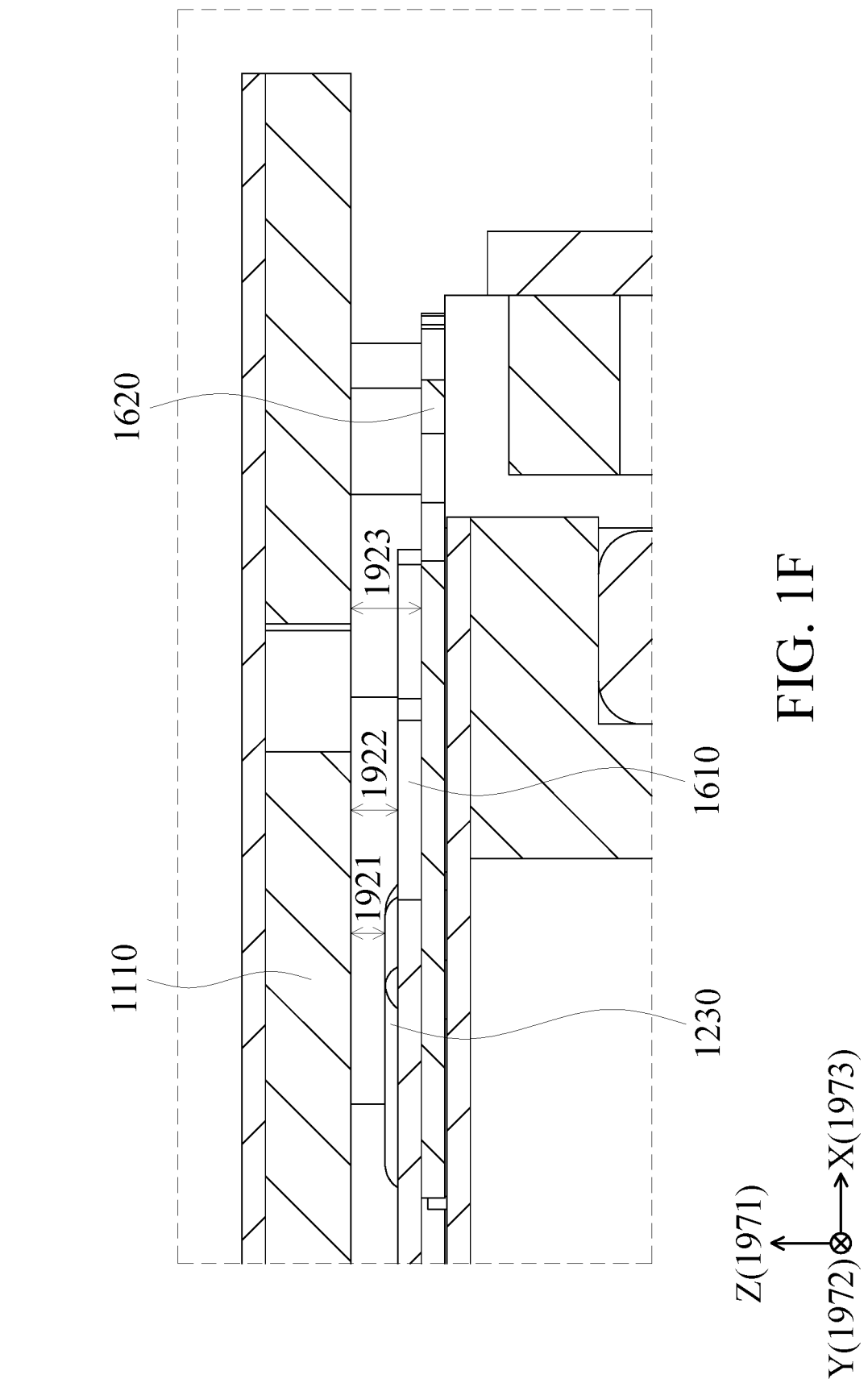
FIG. 1F is an enlarged view of the portion E in FIG. 1E.

Embodiments of the present disclosure disclose an optical element driving mechanism used for controlling the rotational angle of a movable portion to move blades, so an opening of the blades may be controlled continuously. Furthermore, its structure may be simplified to achieve miniaturization. For example, FIG. 1A and FIG. 1B are schematic view of an optical element driving mechanism 1000. A first low-reflection element 1410 is omitted in FIG. 1B to show other elements. FIG. 1C is an exploded view of the optical element driving mechanism 1000. FIG. 1D is a top view of the optical element driving mechanism 1000. FIG. 1E is a cross-sectional view illustrated along line A-A in FIG. 1D. FIG. 1F is an enlarged view of the portion E in FIG. 1E.

As shown in FIG. 1A to FIG. 1F, the optical element driving mechanism 1000 may mainly include a fixed portion 1100 (includes a case 1110 and a bottom 1120), a movable portion 1200, a driving assembly 1300 (includes a first magnetic element 1310, a second magnetic element 1320, a first driving coil 1330, and a second driving coil 1340), a first low-reflection element 1410, a second low-reflection element 1420, a circuit assembly 1500 (includes a first circuit element 1510 and a second circuit element 1520), and a blade assembly 1600 (includes a first blade 1610 and a second blade 1620) arranged along a main axis 1900.

In some embodiments, the case 1110 and the bottom 1120 may combined with each other to form a shell of the optical element driving mechanism 1000 to protect other elements of the optical element driving mechanism 1000. The driving assembly 1300 may be used for driving the movable portion 1200 to move relative to the fixed portion 1100. For example, the first magnetic element 1310 and the second magnetic element 1320 may be disposed on the movable portion 1200 and may correspond to the first driving coil 1330 and the second driving coil 1340, respectively. The first driving coil 1330 and the second driving coil 1340 may be disposed on the bottom 1120. The interaction between the first magnetic element 1310, the second magnetic element 1320, the first driving coil 1330, and the second driving coil 1340, a magnetic force may be generated to rotate the movable portion 1200 relative to the fixed portion 1100 taking the main axis 1900 as its rotational axis.

The first low-reflection element 1410 may be disposed on the case 1110, and the second low-reflection element 1420 may be disposed on the movable portion 1200 to absorb extra light and may achieve aesthetic effect. In particular, the first low-reflection element 1410 and the second low-reflection element 1420 may have black color and may arrange along a first axis 1971 (the Z axis). Furthermore, when viewed along the Z axis, the first low-reflection element 1410 may include a first opening 1810, the second low-reflection element 1420 may include a second opening 1820 which may have a circular shape, and the main axis 1900 may pass through a center 1901 of the second low-reflection element 1420.

The circuit assembly 1500 may be disposed on the bottom 1120, such as may be disposed on both sides of the bottom 1120 to provide power for the operation of the optical element driving mechanism 1000 and transmitting signal to the optical element driving mechanism 1000 to control the movement of the movable portion 1200. The circuit assembly 1500 may include a first circuit element 1510 and the second circuit element 1520, the first driving coil 1330 may be disposed on the first circuit element 1510, and the second driving coil 1340 may be disposed on the second circuit element 1520. In other words, the first driving coil 1330 may correspond to the first magnetic element 1310 and the first circuit element 1510, and the second driving coil 1340 may correspond to the second magnetic element 1320 and the second circuit element 1520.

The blade assembly 1600 may connect to the movable portion 1200 and may move with the movable portion 1200. The blade assembly 1600 may include a plurality of first blade 1610 and second blade 1620 (3 for each in this embodiment, but it is not limited thereto). The first blade 1610 and the second blade 1620 may include different Z coordinate, such as disposed on different positions in the direction that the main axis 1900 extends. When viewed in an axis perpendicular to the main axis 1900 (such as X axis or Y axis, etc.), the first blade 1610 and the second blade 1620 do not overlap each other to prevent interference when moving.

Figure 2A:
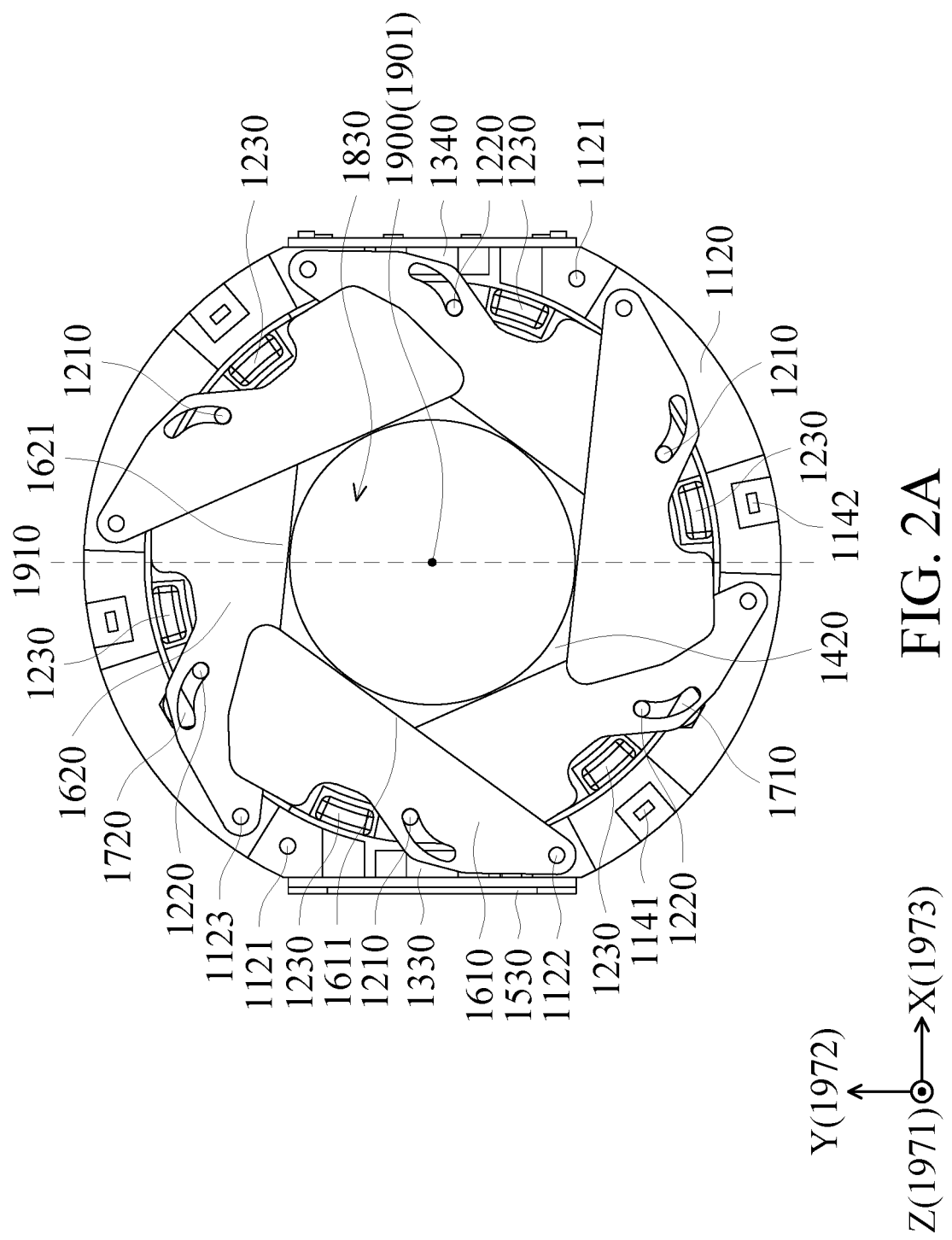
FIG. 2A and FIG. 2B are top views of some elements of the optical element driving mechanism.

In some embodiments, the first blade 1610 and the second blade 1620 may at least partially overlap each other when viewed along the main axis 1900, so a blade opening 1830 may be defined (such as defined by the segment 1611 of the first blade 1610 and the segment 1621 of the second blade 1620 in FIG. 2A), which is the portion that is not blocked by the blade assembly 1600 when viewed along the main axis 1900. The main axis 1900 penetrates the blade opening 1830 to allow light pass through. In some embodiments, the segment 1611 and the segment 1621 may include straight shape or arc shape, etc.

In some embodiments, the size of the blade opening 1830 may be changed with the movement of the movable portion 1200, and the size of the blade opening 1830 may be continuously controlled by the moving content of the movable portion 1200, so the optical element driving mechanism 1000 may achieve functions like aperture or shutter.

In some embodiments, in a first state, the size of the first opening 1810 and the second opening 1820 may be greater than the size of the blade opening 1830, which means the minimum size of the openings of the optical element driving mechanism 1000 is defined by the blade opening 1830. Furthermore, in a second state, at least one of the sizes of the first opening 1810 and the second opening 1820 may be less than the size of the blade opening 1830, which means the minimum size of the openings of the optical element driving mechanism 1000 is defined by the first opening 1810 or the second opening 1820.

In some embodiments, as shown in FIG. 1D, if the first opening 1810 is greater than the second opening 1820, which means the maximum size of the openings of the optical element driving mechanism 1000 is defined by the second opening 1820, at least a portion of the blade assembly 1600 may exposed from the first opening 1810 when viewed along the first axis 1971, but the present disclosure is not limited thereto. In other embodiments (not shown), if the size of the first opening 1810 is less than the second opening 1820, which means the maximum size of the openings of the optical element driving mechanism 1000 is defined by the first opening 1810, at least a portion of the blade assembly 1600 does not expose from the first opening 1810 when viewed along the first axis 1971.

In some embodiments, as shown in FIG. 1F, a stopping portion 1230 may be disposed on the movable portion 1200 protruding from the movable portion 1200 to the case 1110 to limit the movable range of the movable portion 1200 in the Z axis. For example, in the Z axis a distance 1921 is between the stopping portion 1230 and the case 1110, a distance 1922 is between the first blade 1610 and the case 1110, a distance 1923 is between the second blade 1620 and the case 1110, and the distance 1921<the distance 1922<the distance 1923. As a result, when the movable portion 1200 moves along the Z axis (e.g. being hit), the stopping portion 1230 will contact the case 1110 before the first blade 1610 and the second blade 1620 contact the case 1110 to protect the first blade 1610 and the second blade 1620. In some embodiments, a distance 1921 between the stopping portion 1230 and the case 1110 may be greater than 0.3 mm to ensure enough space is provided by the stopping portion 1230 to protect t the first blade 1610 and the second blade 1620.

Figure 2B:
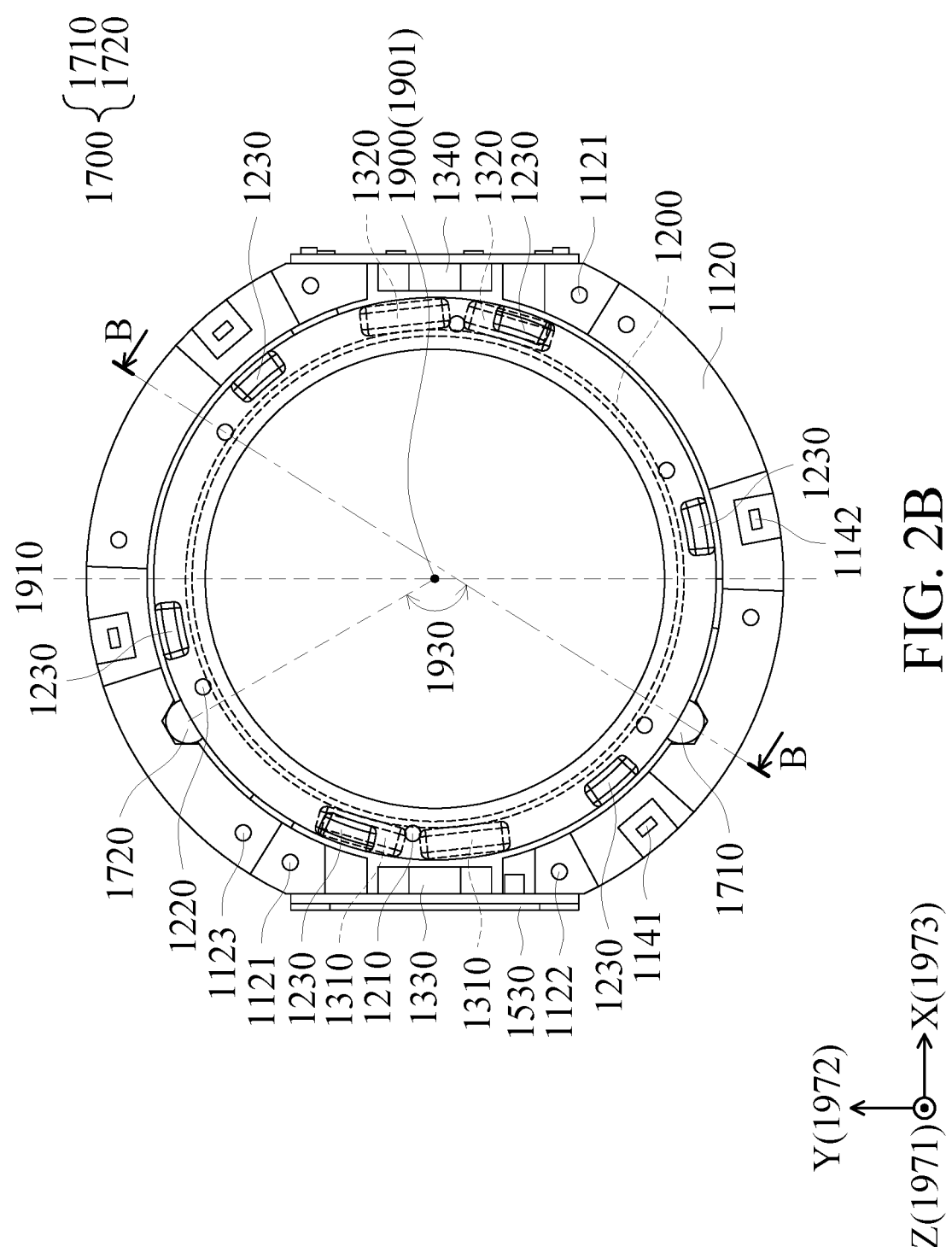
Figure 2C:
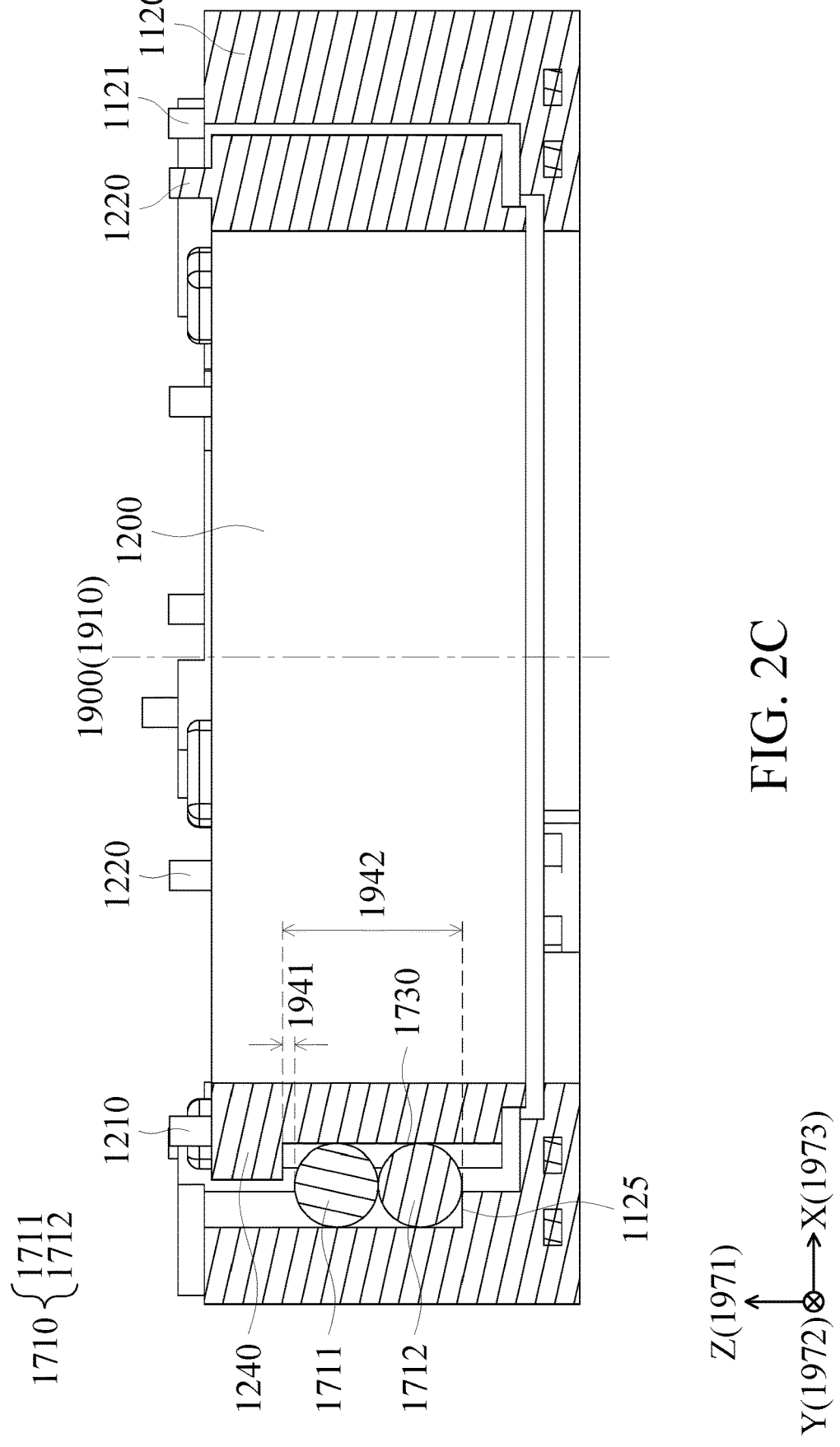
FIG. 2C is a cross-sectional view illustrated along a line B-B in FIG. 2B.

FIG. 2A and FIG. 2B are top views of some elements of the optical element driving mechanism 1000, the state is a second state, and the case 1110 and the first low-reflection element 1410 are omitted in FIG. 2A. The blade assembly 1600 is further omitted in FIG. 2B, the movable portion 1200 is illustrated as transparent to show other elements of the optical element driving mechanism 1000 more clearly. FIG. 2C is a cross-sectional view illustrated along a line B-B in FIG. 2B. As shown in FIG. 2A to FIG. 2C, the optical element driving mechanism 1000 further includes a support assembly 1700 (which includes a first support element 1710 and a second support element 1720) disposed between the bottom 1120 and the movable portion 1200 to reduce the friction between the fixed portion 1100 and the movable portion 1200 when the movable portion 1200 moves relative to the fixed portion 1100.

In some embodiments, a virtual plane 1910 may be defined to overlap the main axis 1900 and parallel to the plane defined by the Y axis and the Z axis. A second axis 1972 may be defined an axis parallel to the arrangement direction of the first support element 1710 and the second support element 1720 (e.g. the Y axis) when viewed along the main axis 1900, and the second axis 1972 may be perpendicular to the first axis 1971 (the Z axis). In some embodiments, when viewed along the main axis 1900, the first support element 1710 and the second support element 1720 may be disposed on and identical side of the virtual plane 1910, and the first magnetic element 1310 and the second magnetic element 1320 may be disposed on opposite sides of the virtual plane 1910. Furthermore, when viewed along the main axis 1900, a connection between the first support element 1710 and the center 1901 and a connection between the center 1901 and the second support element 1720 define an angle 1930, and the angle 1930 may be between 16 and 164 degrees.

In some embodiments, the optical element driving mechanism 1000 may further include a magnetic permeable element 1530 disposed on the first circuit element 1510, and the magnetic permeable element 1530 and the first magnetic element 1310 may be disposed on opposite sides of the first circuit element 1510. The magnetic permeable element 1530 may be magnetic permeable, and the first magnetic element 1310 may be a magnet to generate an attraction magnetic force to the magnetic permeable element 1530. Therefore, the first magnetic element 1310 and the movable portion 1200 may receive a force toward the magnetic permeable element 1530 (e.g. in the —X direction) to stabilize the position of the movable portion 1200, such as making the movable portion 1200 cannot move freely along the Z axis.

Since the support assembly 1700 includes the first support element 1710 and the second support element 1720, which means the movable portion 1200 may be supported by two support elements (first support element 1710 and second support element 1720) to prevent flipping when the movable portion 1200 receiving forces, so the position of the center of the blade opening 1830 may be stabilized. Since the angle 1930 is between 16 and 164 degrees, the movable portion 1200 may be supported more steadily.

It should be noted that the support assembly 1700 and the magnetic permeable element 1530 are not disposed on another side of the virtual plane 1910, which means the magnetic force that the movable portion 1200 receives may be biased to one side of the virtual plane 1910 (the side where the support assembly 1700 is disposed), so as to avoid magnetic forces in opposite directions canceling each other out.

As shown in FIG. 2C, the movable portion 1200 may include an extending portion 1240. When viewed along the first axis 1971, the extending portion 1240 and the support assembly 1700 at least partially overlap each other, such as the extending portion 1240 may partially overlap the first support element 1710 or the second support element 1720. When viewed along the first axis 1971, at least a portion of the support assembly 1700 may be exposed from the extending portion 1240. The first support element 1710 may include a first support unit 1711 and a second support unit 1712 arranged along the first axis 1971, and the first support unit 1711 and the second support unit 1712 may be spherical and in direct contact with the bottom 1120 and the movable portion 1200. The second support element 1720 may have similar structures. Therefore, the spherical first support unit 1711 and the second support unit 1712 may be used to reduce friction between the movable portion 1200 and the bottom 1120 when the movable portion 1200 moves relative to the bottom 1120.

In some embodiments, the support assembly 1700 may be partially disposed on a support surface 1125 of the bottom 1120. Moreover, a first axis 1971 is between the first support element 1710 and the support surface 1125 of the extending portion 1240. In the first axis 1971, a distance 1942 between the support surface 1125 and the extending portion 1240 may be greater than the height of the first support element 1710, and the first axis 1971 is less than the distance 1942 to provide space for the support assembly 1700 to roll for reducing friction. In some embodiments, a lubricating element 1730 may be provided between the support assembly 1700 and the fixed portion 1100 or the movable portion 1200, such as disposed on the support assembly 1700 to further reduce the friction between the support assembly 1700 and the fixed portion 1100 or the movable portion 1200. The lubricating element 1730, for example, may include lubricating oil, Teflon and other materials with a lubricating function.

In some embodiments, the extending portion 1240 and the support surface 1225 may be not overlap each other in the first axis 1971. In other embodiments, the extending portion 1240 and the support surface 1225 may overlap each other in the first axis 1971.

In some embodiments, a plurality of columns may be provided on the bottom 1120 and the movable portion 1200 to allow the blade assembly 1600 being disposed on the bottom 1120 and the movable portion 1200. For example, as shown in FIG. 2A and FIG. 2B, a first bottom column 1121, a second bottom column 1122, and a third bottom column 1123 may be formed on the bottom 1120, and a first movable portion column 1210 and a second movable portion column 1220 may be formed on the movable portion 1200 extending to the case 1110 in the Z axis.

In some embodiments, the first movable portion column 1210 may penetrate the first blade 1610, and the second movable portion column 1220 may penetrate the second blade 1620 to move the first blade 1610 and the second blade 1620 when the movable portion 1200 is in rotation. The second bottom column 1122 penetrates the first blade 1610, the third bottom column 1123 penetrates the second blade 1620 to be rotational axes when the first blade 1610 and the second blade 1620 are in movement.

Furthermore, as shown in FIG. 1A and FIG. 1B, the first bottom column 1121 may penetrate the case 1110 and the first low-reflection element 1410 to define the position of the case 1110 and the first low-reflection element 1410 relative to the bottom 1120, and the first movable portion column 1210 and the second movable portion column 1220 do not penetrate the case 1110 and the first low-reflection element 1410. Therefore, the first movable portion column 1210 and the second movable portion column 1220 cannot be seen from the outside of the optical element driving mechanism 1000, and only the first low-reflection element 1410 is shown to achieve aesthetic effect.

Figure 3A:
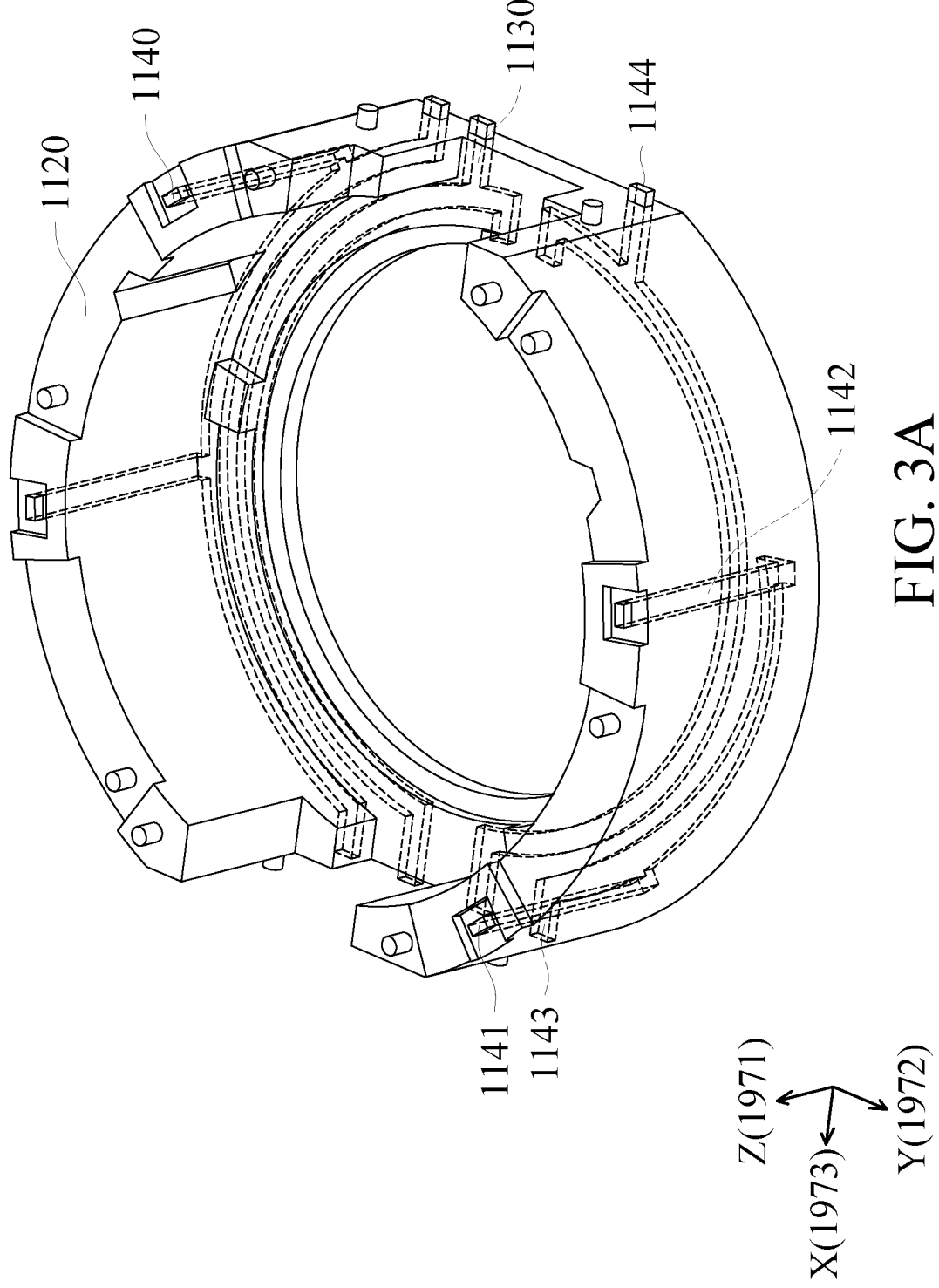
FIG. 3A is a schematic view of the bottom and other elements in the bottom.
Figure 3B:
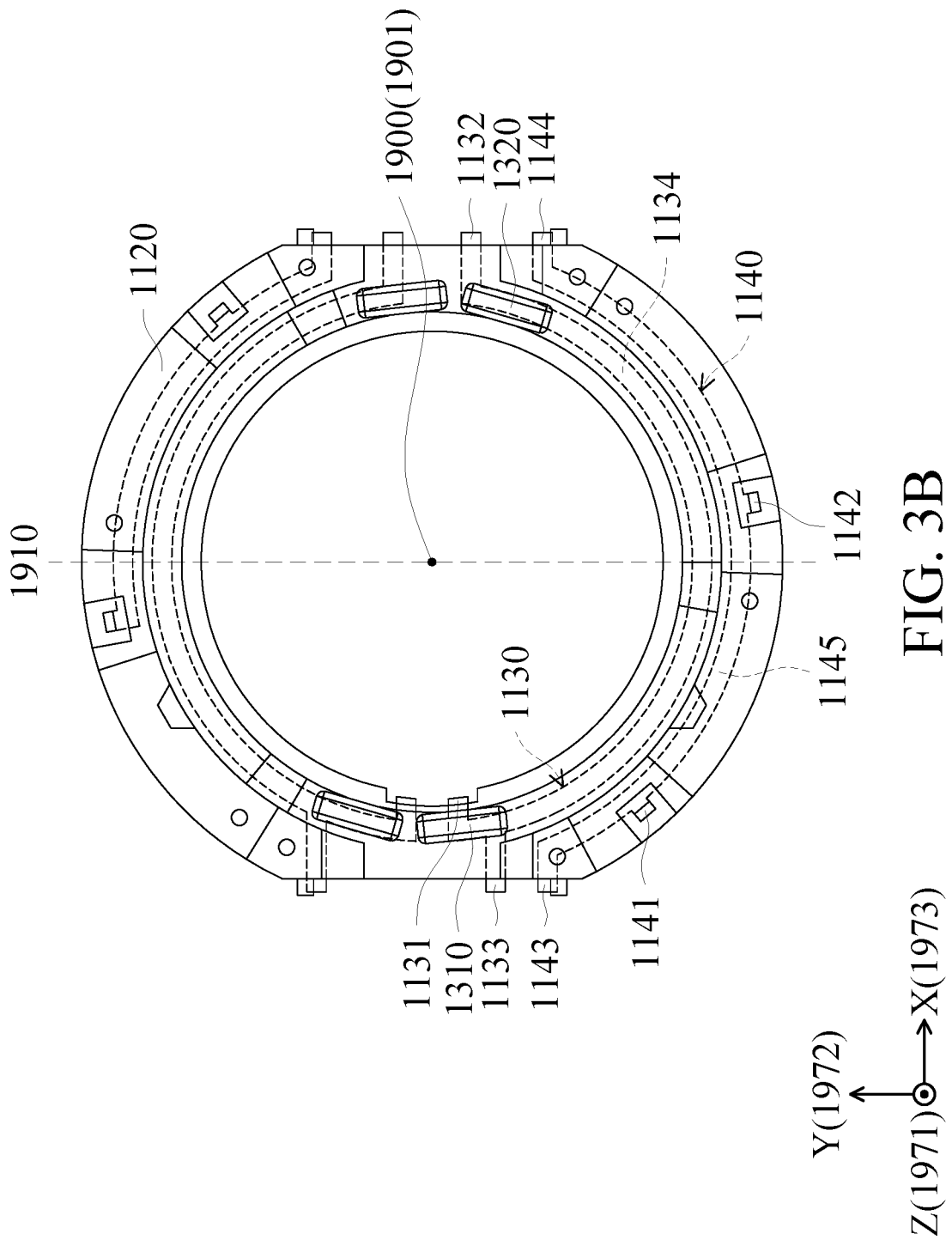
FIG. 3B is a top view of some elements of the optical element driving mechanism.

FIG. 3A is a schematic view of the bottom 1120 and other elements in the bottom 1120. FIG. 3B is a top view of some elements of the optical element driving mechanism 1000. As shown in FIG. 3A and FIG. 3B, the strengthen element 1130 and the conductive element 1140 may be disposed in the bottom 1120 and may have metal material. In some embodiments, the strengthen element 1130 and the conductive element 1140 may include magnetic permeable material.

In some embodiments, as shown in FIG. 3B, when viewed along the first axis 1971, the strengthen element 1130 may include a first strengthen element bending portion 1131, a second strengthen element bending portion 1132, a third strengthen element bending portion 1133, and a strengthen element extending portion 1134. The strengthen element 1130 may connect to the first strengthen element bending portion 1131, the second strengthen element bending portion 1132, and the third strengthen element bending portion 1133, and may extend in an axis perpendicular to the first axis 1971, such as may extend in any direction in the XY plane. In some embodiments, the first strengthen element bending portion 1131, the second strengthen element bending portion 1132, and the third strengthen element bending portion 1133 may bend from the strengthen element extending portion 1134, which means the first strengthen element bending portion 1131, the second strengthen element bending portion 1132, and the third strengthen element bending portion 1133 may extend in different directions to the strengthen element extending portion 1134.

In some embodiments, when viewed along the first axis 1971, at least a portion of the first strengthen element bending portion 1131, the second strengthen element bending portion 1132, and the third strengthen element bending portion 1133 expose from the bottom 1120, and the strengthen element extending portion 1134 does not expose from the bottom 1120. Moreover, the first strengthen element bending portion 1131, the second strengthen element bending portion 1132, and the third strengthen element bending portion 1133 may be spaced apart from each other. For example, the first strengthen element bending portion 1131 and the first magnetic element 1310 may at least partially overlap each other, the second strengthen element bending portion 1132 and the second magnetic element 1320 may at least partially overlap each other, and the third strengthen element bending portion 1133 does not overlap the first magnetic element 1310 and the second magnetic element 1320. Since the strengthen element 1130 may include magnetic permeable material, and the strengthen element 1130 at least partially overlaps the first magnetic element 1310 and the second magnetic element 1320 in the first axis 1971, an attraction magnetic force may be generated to apply a force to the first magnetic element 1310, the second magnetic element 1320, and the movable portion 1200 in −Z direction. Therefore, the movable portion 1200 may be stabilized, thus the light pass through the optical element driving mechanism 1000 may be stabilized.

In some embodiments, the conductive element 1140 may include a first conductive portion 1141, a second conductive portion 1142, a third conductive portion 1143, a fourth conductive portion 1144, an a conductive connection portion 1145 disposed in the bottom 1120. The first conductive portion 1141, the second conductive portion 1142, the third conductive portion 1143, and the fourth conductive portion 1144 may at least partially exposed from the bottom 1120, and the conductive connection portion 1145 does not expose from the bottom 1120. The conductive connection portion 1145 connects to the first conductive portion 1141, the second conductive portion 1142, the third conductive portion 1143, and the fourth conductive portion 1144. In some embodiments, the first conductive portion 1141 and the second conductive portion 1142 extend in the first axis 1971 (the Z axis), the third conductive portion 1143 and the fourth conductive portion 1144 extend in the third axis 1973, and the first axis 1971 and the third axis 1973 may be different, such as may be perpendicular.

When viewed along the main axis 1900, as shown in FIG. 3B, the first conductive portion 1141 and the second conductive portion 1142 may be disposed on opposite sides of the virtual plane 1910, and the third conductive portion 1143 and the fourth conductive portion 1144 may be disposed on opposite sides of the virtual plane 1910, such as the first conductive portion 1141 and the third conductive portion 1143 may be disposed on an identical side of the virtual plane 1910, and the first conductive portion 1141 and the third conductive portion 1143 may extend in different directions. The second conductive portion 1142 and the fourth conductive portion 1144 may be disposed on another side of the virtual plane 1910, and the second conductive portion 1142 and the fourth conductive portion 1144 may extend in different directions. Therefore, required space may be reduced, and interference between signals of the conductive portions may be avoided.

Figure 3C:
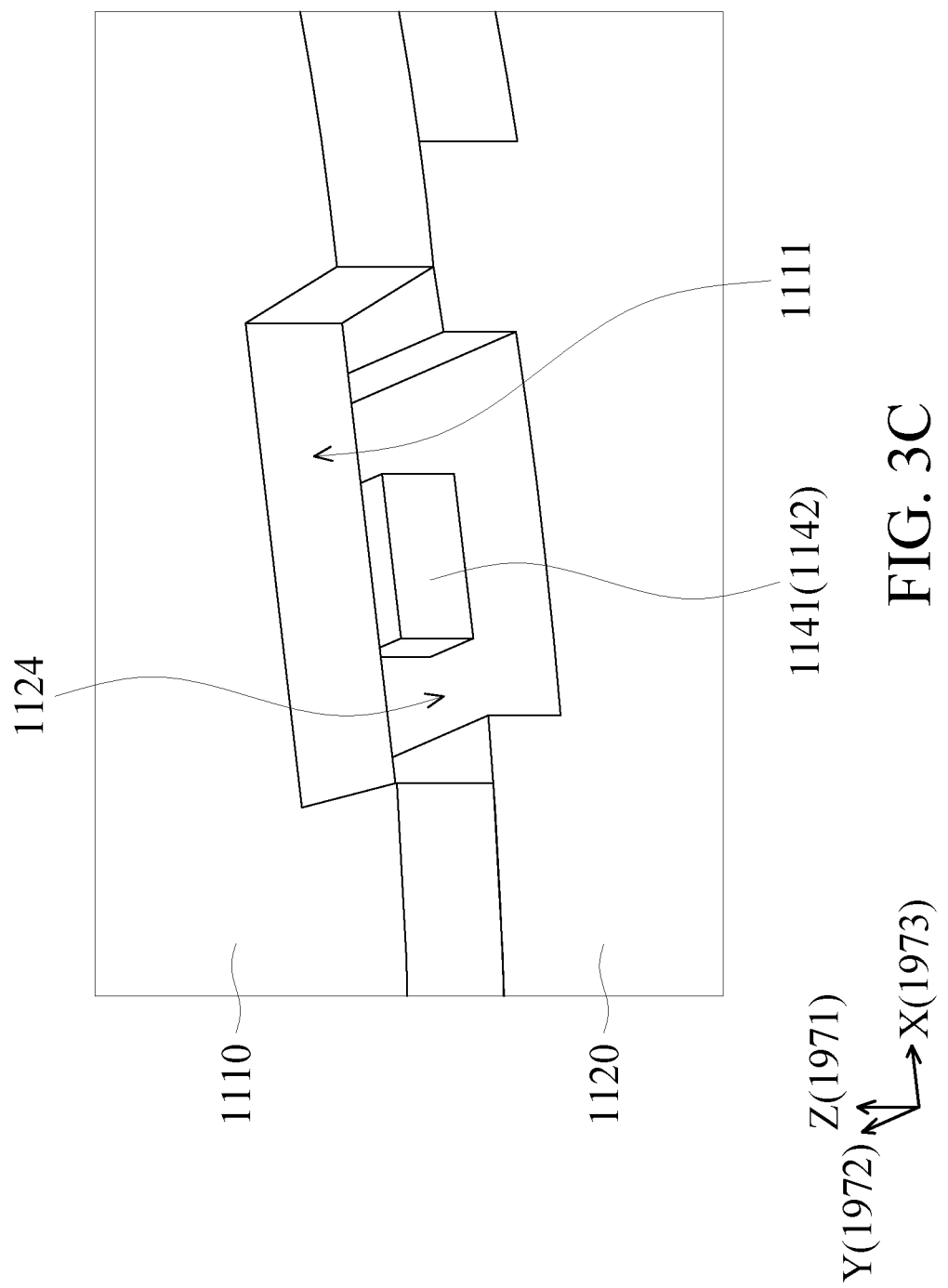
FIG. 3C to FIG. 3E are schematic views of the first conductive portion and nearby elements viewed in different direction.
Figure 3D:
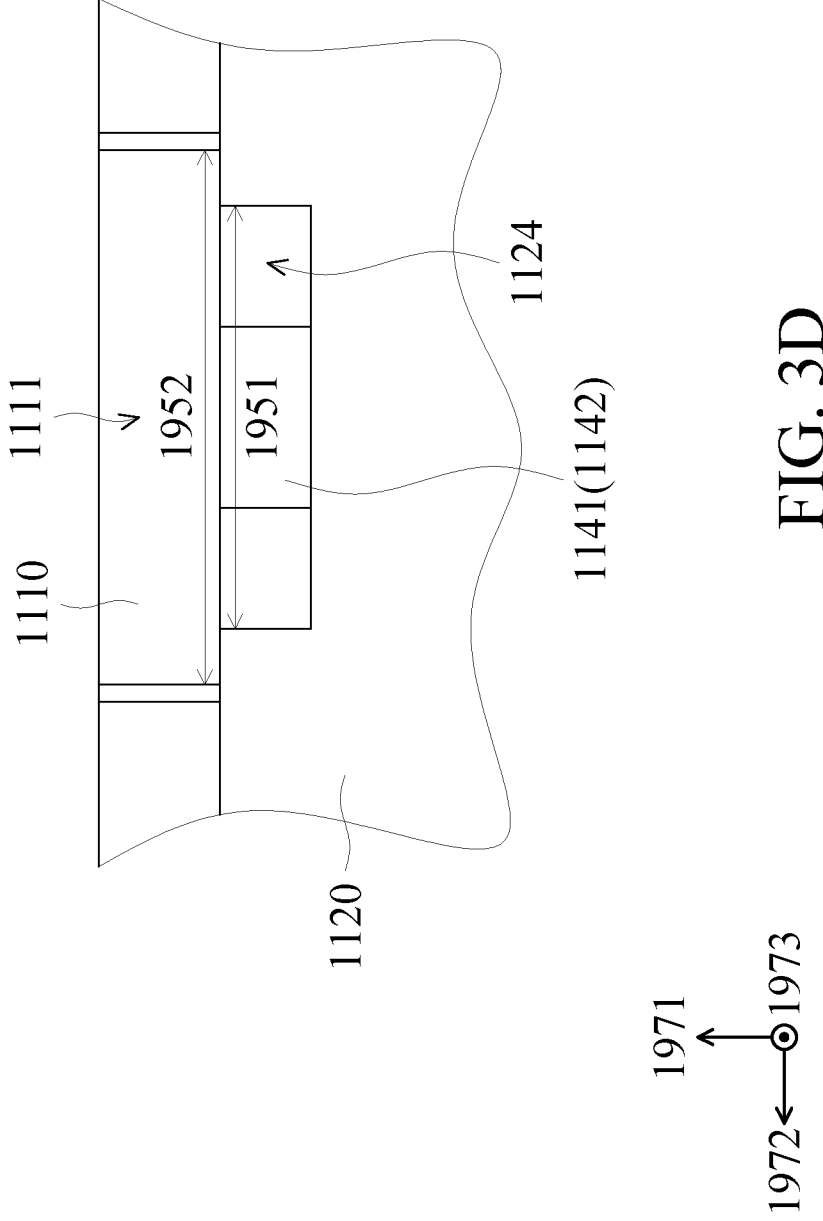
Figure 3E:
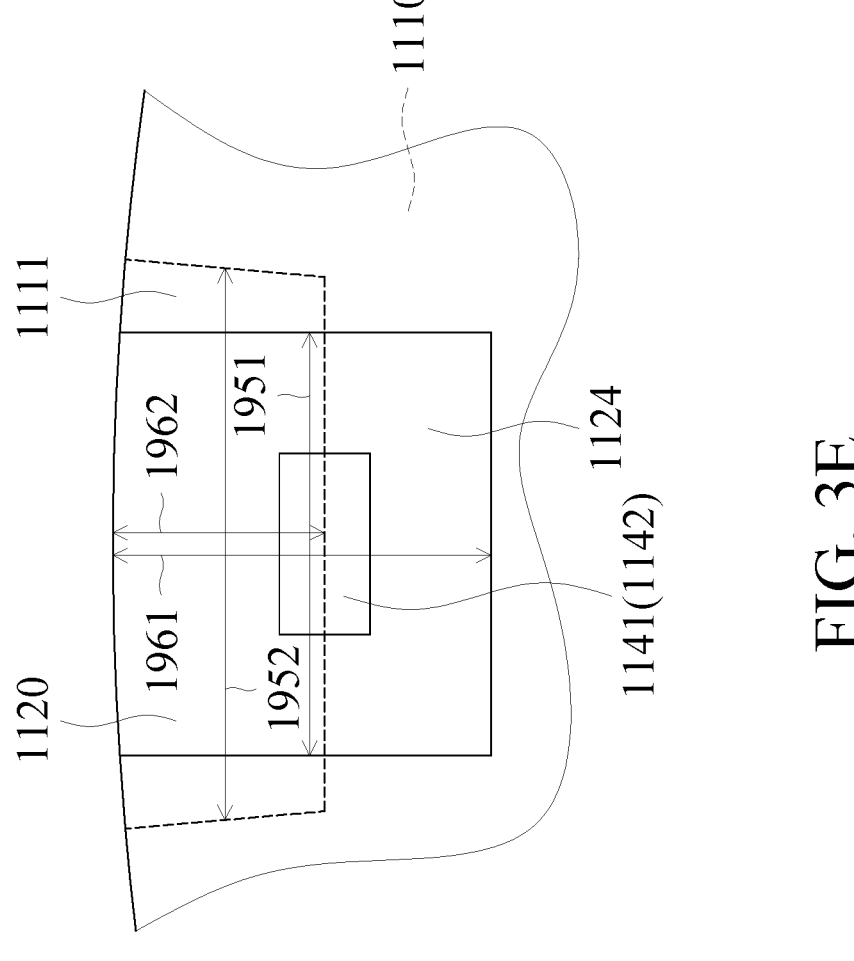

FIG. 3C to FIG. 3E are schematic views of the first conductive portion 1141 and nearby elements viewed in different direction. As shown in FIG. 1A, FIG. 1B, and FIG. 3C to FIG. 3E, the first conductive portion 1141 and the second conductive portion 1142 may be in direct contact with the case 1110, and the case 1110 may be conductive. Therefore, the case 1110 may in direct contact with the conductive element 1140 and electrically connected to the conductive element 1140 to ground through the conductive element 1140 for preventing static interference, electromagnetic interference and improve signal quality and stability.

In some embodiments, the bottom 1120 may include a first recess 1124, and the case 1110 may include a second recess 1971. When viewed along the first axis 1971, as shown in FIG. 3E, the first conductive portion 1141 is disposed in the first recess 1124, a portion of the first conductive portion 1141 overlaps the second recess 1111, another portion of the first conductive portion 1141 does not overlap the second recess 1111, and the first recess 1124 overlaps the second recess 1111. In other words, the first conductive portion 1141 may expose from the first recess 1124 to contact the case 1110 for grounding. The second conductive portion 1142 and nearby elements may have similar structures, and it is not repeated again.

In some embodiments, in the third axis 1973, the first recess 1124 has a first width 1961, the second recess 1111 has a second width 1962, and the first width 1961 is greater than the second width 1962. Moreover, in the second axis 1972 perpendicular to the first axis 1971 and the third axis 1973, the first recess 1124 has a first length 1951, the second recess 1111 has a second length 1952, and the first length 1951 is less than the second length 1952. In other words, the first recess 1124 and the second recess 1111 may form an accommodating space to accommodate glue or insulating material to protect the second conductive portion 1142 and the second conductive portion 1142. This design also includes contact area of the glue or insulating material to increase adhesive strength.

In summary, an optical element driving mechanism is provided, which includes a movable portion, a fixed portion, and a driving assembly. The movable portion is used for connecting the optical element. The movable portion is movable relative to the fixed portion. The driving assembly is used for driving the movable portion to move relative to the fixed portion. In this way, the rotation angle of the movable portion can be controlled by current to drive each blade, so that the size of the blade opening can be continuously controlled, and the structure can be simplified to achieve miniaturization.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
   a movable portion, comprising a holder and an optical element, wherein the optical element is a blade assembly, and the blade assembly comprises a first blade and a second blade arranged in a first axis;
   a fixed portion, wherein the movable portion is movable relative to the fixed portion, the movable portion and the fixed portion are arranged along a main axis, and the main axis extends in the first axis, wherein the fixed portion comprises a case and a bottom; and
   a driving assembly used for driving the movable portion to move relative to the fixed portion, wherein the driving assembly comprises:
   a first magnetic element;
   a second magnetic element, wherein the first magnetic element and the second magnetic element are disposed on opposite sides of a virtual plane, and the virtual plane overlaps the main axis;
   a first driving coil corresponding to the first magnetic element and the first circuit element;
   a second driving coil corresponding to the first magnetic element; and
   a conductive element disposed on the bottom and comprising a first conductive portion, a second conductive portion, a third conductive portion, a fourth conductive portion, and a conductive connection portion disposed in the bottom, wherein the case is in direct contact with the conductive element and electrically connected to the conductive element for grounding through the conductive element.

2. The optical element driving mechanism as claimed in claim 1, wherein:
   the fixed portion further comprises a strengthen element;
   the strengthen element is disposed in the bottom; and
   the strengthen element comprises metal.

3. The optical element driving mechanism as claimed in claim 2, wherein:
   the strengthen element comprises a first strengthen element bending portion, a second strengthen element bending portion, a third strengthen element bending portion, and a strengthen element extending portion;
   the strengthen element extends in an axis perpendicular to the first axis;
   the first strengthen element bending portion connects to the strengthen element extending portion and bends from the strengthen element extending portion;
   the second strengthen element bending portion connects to the strengthen element extending portion and bends from the strengthen element extending portion; and
   the third strengthen element bending portion connects to the strengthen element extending portion and bends from the strengthen element extending portion.

4. The optical element driving mechanism as claimed in claim 3, wherein:
   the strengthen element comprises magnetic permeable material;
   the strengthen element extending portion is not exposed from the bottom when viewed along the first axis;
   at least a portion of the first strengthen element bending portion is exposed from the bottom when viewed along the first axis;

at least a portion of the second strengthen element bending portion is exposed from the bottom when viewed along the first axis; and at least a portion of the third strengthen element bending portion is exposed from the bottom when viewed along the first axis.

5. The optical element driving mechanism as claimed in claim 4, wherein:

the first strengthen element bending portion, the second strengthen element bending portion, and the third strengthen element bending portion are spaced apart from each other;

the first strengthen element bending portion and the first magnetic element at least partially overlap each other when viewed along the main axis; and the second strengthen element bending portion and the second magnetic element at least partially overlap each other when viewed along the main axis.

6. The optical element driving mechanism as claimed in claim 5, further comprising a circuit assembly and a magnetic permeable element;

wherein:

the circuit assembly comprises a first circuit element and a second circuit element;

the first driving coil further corresponds to the first circuit element;

the second driving coil further corresponds to the second circuit element; and the magnetic permeable element is disposed on the first circuit element.

7. The optical element driving mechanism as claimed in claim 6, wherein:

the first magnetic element and the magnetic permeable element are disposed on opposite sides of the first circuit element; and the first circuit element and the second circuit element are disposed on opposite sides of the virtual plane.

8. The optical element driving mechanism as claimed in claim 7, wherein:

the first conductive portion and the second conductive portion extends along the first axis;

the third conductive portion and the fourth conductive portion extends in a third axis; and the first axis and the third axis are different.

9. The optical element driving mechanism as claimed in claim 8, wherein:

the first conductive portion and the second conductive portion are in direct contact with the case;

the first conductive portion, the second conductive portion, the third conductive portion, and the fourth conductive portion at least partially exposed from the bottom;

the conductive connection portion is not exposed from the bottom; and the conductive connection portion connects to the first conductive portion, the second conductive portion, the third conductive portion, and the fourth conductive portion.

10. The optical element driving mechanism as claimed in claim 9, wherein:

the first conductive portion and the second conductive portion are disposed on opposite sides of the virtual plane when viewed along the main axis; and the third conductive portion and the fourth conductive portion are disposed on opposite sides of the virtual plane when viewed along the main axis.

11. The optical element driving mechanism as claimed in claim 10, wherein:

the first conductive portion and the third conductive portion are disposed on an identical side of the virtual plane when viewed along the main axis;

the second conductive portion and the fourth conductive portion are disposed on an identical side of the virtual plane when viewed along the main axis;

the first conductive portion and the third conductive portion extend in different axes; and the second conductive portion and the fourth conductive portion extend in different axes.

12. The optical element driving mechanism as claimed in claim 11, wherein:

the bottom comprises a first recess;

the case comprises a second recess;

the first conductive portion is disposed in the first recess when viewed along the first axis;

a portion of the first conductive portion overlaps the second recess when viewed along the first axis;

another portion of the first conductive portion do not overlap the second recess when viewed along the first axis; and the first recess and the second recess partially overlap with each other.

13. The optical element driving mechanism as claimed in claim 12, wherein:

the first conductive portion is exposed form the first recess;

the third axis and the first axis are perpendicular;

the first recess has a first width in the third axis;

the second recess has a second width in the third axis; and the first width is greater than the second width.

14. The optical element driving mechanism as claimed in claim 13, wherein:

a second axis is perpendicular to the first axis and the third axis;

the first recess has a first length in the second axis;

the second recess has a second length in the second axis; and the first length is less than the second length.

15. The optical element driving mechanism as claimed in claim 14, wherein:

the movable portion further comprises a stopping portion;

the stopping portion extends from the holder to the case; and the blade assembly and the case are arranged along the first axis.

16. The optical element driving mechanism as claimed in claim 15, wherein:

a distance between the stopping portion and the case is less than a distance between the first blade and the case in the first axis; and a distance between the stopping portion and the case is less than a distance between the second blade and the case in the first axis.

17. The optical element driving mechanism as claimed in claim 16, wherein:

a distance between the stopping portion and the case is greater than 0.3 mm in the first axis;

the movable portion further comprises a first movable portion column and a second movable portion column extending to the case;

the first movable portion column and the second movable portion column do not penetrate the case;

the first movable portion column penetrates the first blade; and the second movable portion column penetrates the second blade.

18. The optical element driving mechanism as claimed in claim 17, further comprising a first low-reflection element disposed on the fixed portion;

the bottom comprises a first bottom column extending in the first axis;

the first bottom column penetrates the case; and the first bottom column penetrates the first low-reflection element.

19. The optical element driving mechanism as claimed in claim 18, wherein:

the bottom further comprises a second bottom column, and a third bottom column extending in the first axis;

the second bottom column does not penetrate the case;

the second bottom column does not penetrate the first low-reflection element;

the second bottom column penetrates the first blade;

the third bottom column does not penetrate the case;

the third bottom column does not penetrate the first low-reflection element; and the third bottom column penetrates the second blade.

\* \* \* \* \*